(12) United States Patent
Audet et al.

(10) Patent No.: US 10,687,420 B2
(45) Date of Patent: Jun. 16, 2020

(54) MULTI-LAYER CIRCUIT USING METAL LAYERS AS A MOISTURE DIFFUSION BARRIER FOR ELECTRICAL PERFORMANCE

(71) Applicant: INTERNATIONAL BUSINESS MACHINES CORPORATION, Armonk, NY (US)

(72) Inventors: Jean Audet, Granby (CA); Edmund D. Blackshear, Wappingers Falls, NY (US); Masahiro Fukui, Kagoshima (JP); Charles L. Reynolds, Red Hook, NY (US); Kenji Terada, Moriyama (JP); Tomoyuki Yamada, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 211 days.

(21) Appl. No.: 15/068,884

(22) Filed: Mar. 14, 2016

(65) Prior Publication Data

US 2016/0211229 A1 Jul. 21, 2016

Related U.S. Application Data

(62) Division of application No. 14/597,730, filed on Jan. 15, 2015.

(51) Int. Cl.
*H05K 1/03* (2006.01)
*H01L 23/498* (2006.01)
(Continued)

(52) U.S. Cl.
CPC ..... *H05K 1/0353* (2013.01); *H01L 23/49822* (2013.01); *H01L 23/564* (2013.01);
(Continued)

(58) Field of Classification Search
CPC ... H01L 23/26; H01L 23/564; H01L 51/5253; H01L 51/5256; H01L 23/3735; H01L 23/49822
See application file for complete search history.

(56) References Cited

U.S. PATENT DOCUMENTS 6,125,036 A 9/2000 Kang et al.
6,130,472 A 10/2000 Feger et al.
(Continued)

FOREIGN PATENT DOCUMENTS

CN 103247581 A 8/2013

OTHER PUBLICATIONS

"Thermal Physics" by C. Kittel and H. Kroemer, pp. 395-399, published 1980.*
(Continued)

*Primary Examiner* — Kevin Parendo
(74) *Attorney, Agent, or Firm* — Steven Meyers; Andrew M. Calderon; Roberts Calderon Safran & Cole, P.C.

(57) ABSTRACT

A multi-layer substrate with metal layers as a moisture diffusion barrier for reduced electrical performance degradation over time after moisture exposure and methods of design and manufacture. The method includes determining a diffusion rate of an insulator material provided between an upper metal layer and an underlying signal line. The method further includes calculating a diffusion distance between a plane opening of the upper metal layer and the underlying signal line using the diffusion rate of the insulator material.

11 Claims, 5 Drawing Sheets

(51) Int. Cl.
*H01L 23/00* (2006.01)
*H01L 51/44* (2006.01)
*H01L 51/10* (2006.01)
*H01L 51/52* (2006.01)
*H01L 23/14* (2006.01)

(52) U.S. Cl.
CPC .......... *H01L 51/107* (2013.01); *H01L 51/448* (2013.01); *H01L 51/5253* (2013.01); *H01L 23/145* (2013.01); *H01L 23/49827* (2013.01); *H01L 2924/0002* (2013.01); *Y02P 70/521* (2015.11)

(56) References Cited

U.S. PATENT DOCUMENTS

| | | | |
|---|---|---|---|
| 6,596,549 | B2 | 7/2003 | Kitamura et al. |
| 6,720,203 | B2 | 4/2004 | Carcia et al. |
| 6,726,996 | B2 | 4/2004 | Barth et al. |
| 7,232,478 | B2 | 6/2007 | Owei et al. |
| 7,543,263 | B2 | 6/2009 | Kitamura |
| 8,446,707 | B1 * | 5/2013 | Das ................. H01G 4/33 361/303 |
| 2001/0051707 | A1 | 12/2001 | Fukuoka et al. |
| 2002/0145203 | A1 * | 10/2002 | Adae-Amoakoh ............ H01L 21/4857 257/778 |
| 2003/0147227 | A1 * | 8/2003 | Egitto ............ H01L 21/4853 361/795 |
| 2004/0256731 | A1 * | 12/2004 | Mao ................ C08L 65/00 257/773 |
| 2005/0133921 | A1 | 6/2005 | Oki et al. |
| 2005/0151266 | A1 | 7/2005 | Yoshizawa et al. |
| 2005/0218524 | A1 * | 10/2005 | Japp ............... H01L 23/145 257/762 |
| 2006/0102384 | A1 * | 5/2006 | Watanabe ......... H01L 23/49816 174/256 |
| 2006/0264028 | A1 | 11/2006 | Matz et al. |
| 2008/0142864 | A1 * | 6/2008 | Takahashi ......... H01L 21/7685 257/306 |
| 2009/0290317 | A1 | 11/2009 | Mashino |
| 2010/0244260 | A1 | 9/2010 | Hinomura |
| 2011/0201155 | A1 | 8/2011 | Kuroda et al. |
| 2015/0262970 | A1 | 9/2015 | Hashiura |

OTHER PUBLICATIONS

"Introduction to Solid State Physics" by C. Kittel, published 1996.*
Specification "Multi-Layer Circuit Using Metal Layers As a Moisture Diffusion Barrier for Electrical Performance" for related U.S. Appl. No. 14/597,730, 26 pages.
Specification "Multi-Layer Circuit Using Metal Layers As a Moisture Diffusion Barrier for Electrical Performance" for related U.S. Appl. No. 15/068,891, 25 pages.
S. Yu, "A Study of Moisture Diffusion in Polymeric Packaging Materials Especially at High Temperatures", National University of Singapore, 2002, 143 pages.
Office Action from related U.S. Appl. No. 14/597,730 dated Mar. 15, 2016; 17 pages.
E. Blackshear et al., "Advanced Laminate Carrier Module Warpage Considerations for 32nm Pb-free, FC PBGA Package Design and Assembly," 61st Electronic Components and Technology Conference (ECTC), 2011, pp. 523-529.
J. Choi et al., "Constructing 3D package component broadband electrical models with correct DC values," 19th conference on Electrical Performance of Electronic Packaging and Systems (EPEPS), 2010, pp. 253-256.
Office Action in the related U.S. Appl. No. 15/068,891 dated Aug. 3, 2016, 25 pages.
Office Action in the related U.S. Appl. No. 14/597,730 dated Aug. 3, 2016, 29 pages.
Final Office Action in related U.S. Appl. No. 14/597,730 dated Jan. 4, 2017, 46 pages.
Final Office Action in related U.S. Appl. No. 15/068,891 dated Jan. 4, 2017, 42 pages.
Office Action in related U.S. Appl. No. 14/597,730 dated Dec. 4, 2017, 42 pages.
Office Action in related U.S. Appl. No. 15/068,891 dated Nov. 7, 2017, 43 pages.
Chinese Office Action in related Chinese Application No. 201610024907.0 dated May 4, 2018, 9 pages.
Yu, "A Study of moisture diffusion in polymeric packaging material especially at high temperatures", Scholar bank, May 25, 2005, 46 pages. <http://sxholarbank.nus.edu.sg/handle/10635/14818>.
Final Office Action in related U.S. Appl. No. 15/068,891 dated May 11, 2018, 19 pages.
Final Office Action dated Jun. 13, 2018 in related U.S. Appl. No. 14/597,730 33 pages.
Office Action dated May 3, 2019 in related U.S. Appl. No. 14/597,730, 12 pages.
Final Office Action dated Oct. 23, 2019 in related U.S. Appl. No. 14/597,730, 13 pages.
Office Action dated Feb. 7, 2020 in related U.S. Appl. No. 14/597,730, 15 pages.

* cited by examiner $E(max) = E(typ) + D_1$ w/o Solid Cu Plane
Cu loading ratio : 16.1 %

MULTI-LAYER CIRCUIT USING METAL LAYERS AS A MOISTURE DIFFUSION BARRIER FOR ELECTRICAL PERFORMANCE

FIELD OF THE INVENTION

The invention relates to semiconductor structures and, more particularly, to a multi-layer substrate with metal layers as a moisture diffusion barrier for reduced electrical performance degradation over time after moisture exposure and methods of design and manufacture.

BACKGROUND

In electronics manufacturing, electronic packaging is one of the final stages of semiconductor device fabrication. The trend for the electronic circuit packaging industry is to use ultra-low CTE organic materials in the substrate for packaging. It has been found, though, that organic materials are sensitive to moisture which can lead to degradation of electrical performance within the electronic circuit due to insertion loss. That is, moisture can enter the package and propagate to the underlying signal line, which would degrade electrical performance. This is also known as moisture induced insertion loss.

In order to avoid such electrical performance degradation, it is necessary to maintain a dry environment. These dry environments, though, have time limits, are expensive to implement and are conducive to electrostatic discharge. Another solution to prevent degradation of electrical performance is the use of chemicals. But, such chemicals are not environmentally friendly.

SUMMARY

In an aspect of the invention, a method comprises determining a diffusion rate of water through an insulator material provided between an upper metal layer and an underlying signal line. The method further comprises calculating a diffusion distance between a plane opening of the upper metal layer and the underlying signal line using a diffusion coefficient of the insulator material and the diffusion rate.

In an aspect of the invention, a method comprises determining a diffusion coefficient of an insulator material provided between an upper metal layer and an underlying signal line. The method further comprises establishing environmental conditions and establishing a time in which an electrical circuit will maintain a predetermined electrical performance. The method further comprises calculating a lateral offset distance between a plane opening of the upper metal layer and the underlying signal line using the diffusion coefficient, environmental conditions and time.

In an aspect of the invention, a structure comprises an insulator layer provided between an outer metal layer and a signal line, wherein the insulator layer employs a diffusion distance to stabilize controlled insertion loss over a predetermined period of time under predetermined environmental conditions, and target moisture sensitivity level for high speed signal performance.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of the multi-layer substrate, which comprises the structures of the present invention. In still further embodiments, a method in a computer-aided design system is provided for generating a functional design model of the multi-layer substrate. The method comprises generating a functional representation of the structural elements of the multi-layer substrate.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
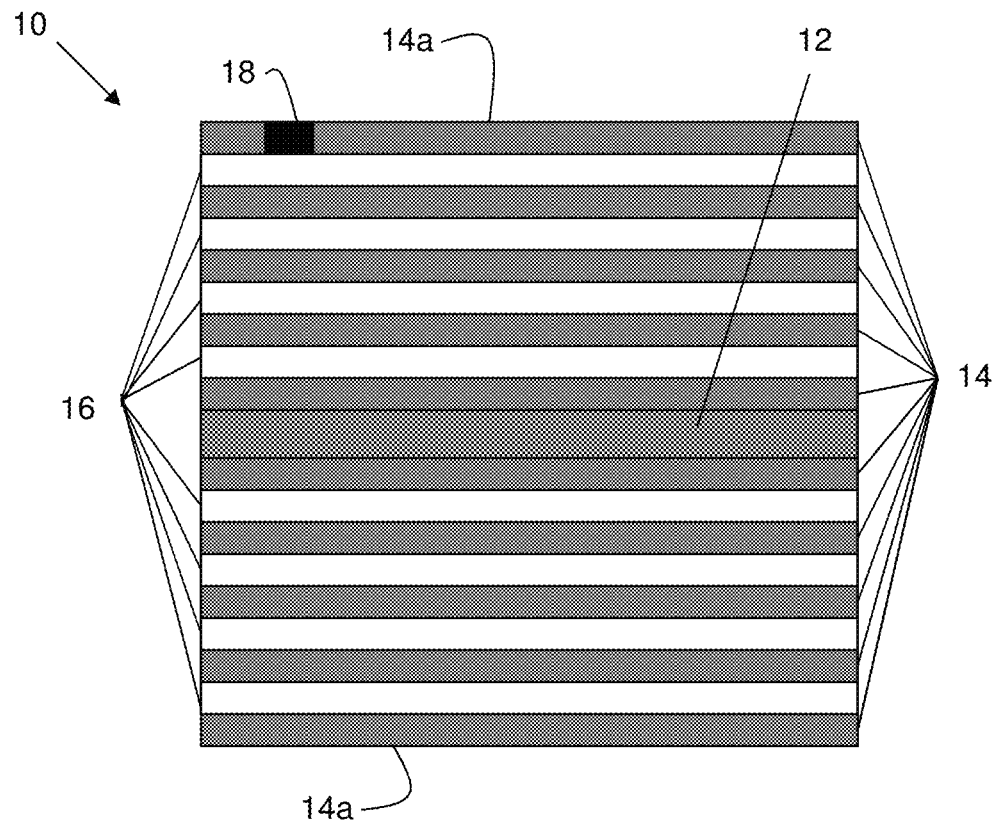
FIG. 1 shows a full multi-layer substrate cross section in accordance with aspects of the present invention.

The invention relates to semiconductor structures and, more particularly, to a multi-layer substrate using metal layers as a moisture diffusion barrier for improved electrical performance and methods of design and manufacture. More specifically, the designs of the multi-layer substrate of the present invention improve electrical performance by preventing degradation of electrical performance due to moisture ingress through one or more vias in a substrate cladding (e.g., outer metal layers). In specific embodiments, the multi-layer substrate is used with ultra-low coefficient of thermal expansion (CTE) organic circuits to control insertion loss by slowing down the moisture diffusion to underlying signal lines.

In embodiments, the multi-layer substrate utilizes a designed lateral offset between a plane opening (e.g., a via in an upper metal layer) and a signal line (also known as a signal trace) to prevent moisture propagation to the underlying signal line. To provide the lateral offset, the methods of designing the multi-layer substrate take into account many different factors including, for example, diffusion rate of the insulator layer, diffusion coefficient, humidity, time, and temperature in order to maintain an insertion loss criteria.

As should be understood by those of skill in the art, the diffusion rate is a variable, which is based on Fick's law; whereas, diffusion coefficient is a fixed term associated with a particular material. For example, diffusion rate can be a time for moisture to travel a certain distance, e.g., through a certain thickness, of a material; whereas, the diffusion coefficient can be based on a number of milliliters of a gas that will diffuse at a distance of 0.001 mm through a square centimeter surface per minute, at 1 atmosphere of pressure. In embodiments, the methods of the present invention further take into account (or can calculate) shelf life based upon a given diffusion coefficient, environmental conditions, and target moisture sensitivity level for high speed signal performance. Accordingly, the methods of the present invention provide designs for ultra-low CTE organic circuit layouts with stable controlled insertion loss and design circuit setbacks from laminate edge for low insertion loss.

The multi-layer substrate of the present invention can be manufactured in a number of ways using a number of different tools. In general, though, the methodologies and tools are used to form structures with dimensions in the micrometer scale. The methodologies, i.e., technologies, employed to manufacture the multi-layer substrate of the present invention have been adopted from integrated circuit (IC) technology. For example, the structures of the present invention are built on wafers and are realized in films of material patterned by photolithographic processes on the top of a wafer. In particular, the fabrication of the multi-layer substrate of the present invention uses three basic building blocks: (i) deposition of thin films of material on a substrate, (ii) applying a patterned mask on top of the films by photolithographic imaging, and (iii) etching the films selectively to the mask.

FIG. 1 shows a multi-layer substrate in accordance with aspects of the present invention. In particular, the multi-layer substrate 10 includes a core layer 12 with alternating metal layers 14 and insulator layers 16. In embodiments, the core layer 12 can be, for example, a fiber glass epoxy substrate approximately 200 microns thick; although other materials and thicknesses are contemplated by the present invention. The metal layers 14 can be, for example, copper. The insulator layers 16 can be, for example, polyimide based dielectric materials or other organic materials with ultra-low CTE.

In embodiments, outer metal layers 14a are comprised of continuous metal planes to serve as a moisture diffusion barrier for the interior insulator layers 16. In some designs, the outer metal layers 14a are of a denser and thicker material than the inner metal layers 14 to prevent or limit moisture diffusion. For example, the outer metal layers 14a can be clad with nickel or other materials to limit moisture diffusion. Designing with these outer metal layers 14a is easy to implement, low cost, and prevents the degradation of performance due to moisture ingress.

In some designs, the multi-layer substrate 10 can include one more openings or vias 18 in the outer metal layers 14a. In embodiments, these vias 18 can be used to connect the substrate to a device (e.g., by solder ball or other connection mechanism). However, moisture can enter through the vias 18 and propagate through the underlying insulator layers 16 to a signal layer, leading to degradation in electrical performance due to insertion loss. The present invention solves this issue for established target times, e.g., shelf lives.

Figure 2:
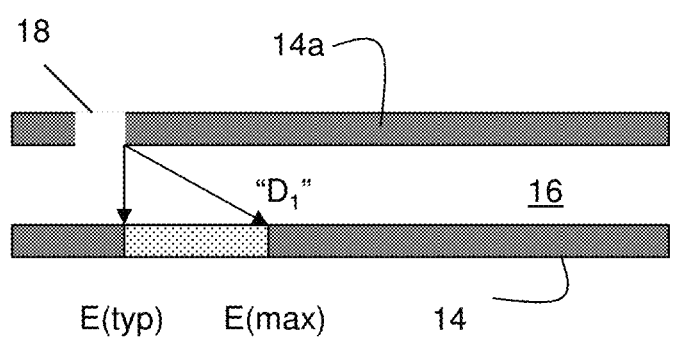
FIG. 2 shows a partial cross-sectional view of the multi-layer substrate in accordance with aspects of the present invention.

As shown in FIG. 2, the present invention solves the issue of moisture propagation and insertion loss issue by designing the insulator layer 16 between the outer metal layers 14a and signal plane 14 to be a certain setback, taking into account different variables. As shown representatively in FIG. 2, diffusing moisture moves in three dimensions down a concentration gradient from an area of higher concentration to an area of lower concentration.

More specifically, the present invention optimizes the electrical design distance (thickness) of the insulator layer 16, e.g., E(max), to meet electrical requirements even with exposure to moisture environments. By way of example, the present invention calculates a maximum diffusion distance $D_1$ from the opening (via) 18 in the metal plane (e.g., outer metal layer) 14a to the signal line 14 to prevent moisture from contacting the signal line 14 over a certain time window (e.g., shelf life). In embodiments, diffusion distance $D_1$ can be determined by the rate of diffusion of the insulator layer 16, taking into consideration environmental factors based on an established shelf life, as well as other factors noted herein. The rate of diffusion can take into consideration the diffusion coefficient for the particular material in view of certain environmental conditions. The diffusion distance $D_1$ can also be calculated using a target moisture sensitivity level of the insulator, for high speed signal performance. More specifically, the present invention determines a diffusion rate of an insulator material provided between an upper metal layer and an underlying signal line, and calculates a diffusion distance between a plane opening of the upper metal layer and the underlying signal line using the diffusion coefficient of the insulator material and the diffusion rate as described herein.

More specifically, as shown representatively in FIG. 2, the electrical design distance "E(max)" from the opening 18 to the signal line 14 is determined by the rate of moisture diffusion and the diffusion distance $D_1$, which can take into consideration environmental conditions, e.g., humidity, temperature, etc. In such a design, the lateral offset distance, e.g., diffusion distance $D_1$, from the opening 18 of the reference plane (e.g., outer metal layer) 14a to the signal line 14 is made larger to maintain a certain insertion loss for a certain humidity and temperature and time window. In more specific embodiments, E(max)=E(typ)+diffusion distance $D_1$. E(typ) is the distance between the opening 18 of the reference plane (e.g., outer metal layer) 14a to the signal line 14, orthogonal to the reference plane.

In embodiments, determinants of diffusion time "t" include distance of diffusion (lateral distance) "$D_1$" and the diffusion rate (using the diffusion coefficient). As should be understood by those of skill in the art, the diffusion time "t" increases with the square of diffusion distance "$D_1$", and the diffusion coefficient is a function of a number of factors including molecular weight of the diffusing species, temperature, and viscosity of the medium in which diffusion occurs.

By way of more specific example, the diffusion coefficient of polyimide or other materials can be measured through experimentation or calculation using, for example, Fick's laws of diffusion. By calculating Fick's law, it is possible to determine the diffusion coefficient of a particular material which, in turn, can be used to determine E(max) (e.g., based on a setback "$D_1$" from an edge of the opening 18 to a signal line 14 to prevent moisture saturation of the dielectric surrounding the signal line 14 in an established time period), as provided in the below example.

In an illustrative example, Fick's first law relates the diffusive flux to the concentration under the assumption of steady state. Fick's first law postulates that the flux goes from regions of high concentration to regions of low concentration, with a magnitude that is proportional to the concentration gradient (spatial derivative). In one (spatial) dimension:

$$J = -D \frac{\partial \phi}{\partial x}$$

J is the "diffusion flux" [(amount of substance) per unit area per unit time], example $$\left( \frac{mol}{m^2 \cdot s} \right).$$

J measures the amount of substance that will flow through a small area during a small time interval;

D is the diffusion coefficient or diffusivity in dimensions of [length$^2$ time$^{-1}$], example $$\left(\frac{m^2}{s}\right);$$

φ (for ideal mixtures) is the concentration in dimensions of [amount of substance per unit volume], example $$\left(\frac{mol}{m^3}\right);$$

and x is the position [length], example m.

D is proportional to the squared velocity of the diffusing particles, which depends on the temperature, viscosity of the fluid and the size of the particles according to the Stokes-Einstein relation. In dilute aqueous solutions the diffusion coefficients of most ions are similar and have values that at room temperature are in the range of $0.6\times10^{-9}$ to $2\times10^{-9}$ m$^2$/S.

In two or more dimensions ∇ (del or gradient operator) is used to generalize the first derivative, thereby obtaining:

$$J = -D\nabla\phi.$$

The driving force for the one-dimensional diffusion is the quantity $$-\frac{\partial\phi}{\partial x}$$

which for ideal mixtures is the concentration gradient. In chemical systems other than ideal solutions or mixtures, the driving force for diffusion of each species is the gradient of chemical potential of this species. Then Fick's first law (one-dimensional case) can be written as:

$$J_i = -\frac{Dc_i}{RT}\frac{\partial\mu_i}{\partial x}$$

where the index i denotes the ith species, c is the concentration (mol/m$^3$), R is the universal gas constant (J/(K mol)), T is the absolute temperature (K), and μ is the chemical potential (J/mol).

If the primary variable is mass fraction ($y_i$, given, for example, in $$\left(\frac{kg}{kg}\right),$$

then the equation changes to:

$$J_i = -\rho D \nabla y_i$$

where ρ is the fluid density (for example, in $$\left(\frac{kg}{m^3}\right).$$

Note that the density is outside the gradient operator.

Fick's second law predicts how diffusion causes the concentration to change with time:

$$\frac{\partial\phi}{\partial t} = D\frac{\partial^2\phi}{\partial x^2}$$

where:

φ is the concentration in dimensions of [(amount of substance) length$^{-3}$], example $$\left(\frac{mol}{m^3}\right);$$

t is time [s];

D is the diffusion coefficient in dimensions of [length$^2$ time$^{-1}$], example $$\left(\frac{m^2}{s}\right);$$

and x is the position [length], example m.

It can be derived from Fick's First law and the mass conservation in absence of any chemical reactions:

$$\frac{\partial\phi}{\partial t} + \frac{\partial}{\partial x}J = 0 \Rightarrow \frac{\partial\phi}{\partial t} - \frac{\partial}{\partial x}\left(D\frac{\partial}{\partial x}\phi\right) = 0$$

Assuming the diffusion coefficient D to be a constant it is possible exchange the orders of the differentiation and multiply by the constant:

$$\frac{\partial}{\partial x}\left(D\frac{\partial}{\partial x}\phi\right) = D\frac{\partial}{\partial x}\frac{\partial}{\partial x}\phi = D\frac{\partial^2\phi}{\partial x^2}$$

and, thus, receive the form of the Fick's equations as described above.

For the case of diffusion in two or more dimensions Fick's Second Law becomes:

$$\frac{\partial\phi}{\partial t} = D\nabla^2\phi.$$

By using the above, it is possible to design the multi-layer substrate for improved electrical performance. By way of example, E(max) can be calculated to obtain an optimal or maximum distance from an exposure point, e.g., plane opening in an upper metal layer, to an underlying structure, e.g., wiring plane or circuit. That is, E(max) is equal to the diffusion distance plus an electrical design distance in an orthogonal orientation between the upper metal layer and the underlying signal line.

By way of illustrative example and in view of the above explanation, the processes of the present invention can determine where a 50% saturated concentration is after a certain amount of time using copper with a diffusion coefficient of 0 and a dielectric material with a diffusion coefficient of 1.44e-12. In this example, it is assumed a copper layer thickness of 8 um and dielectric layer thickness of 15 um, with a boundary condition of 100% on the top surface and an initial condition of 0% saturation on the whole body. For a first case assuming a copper trace right below the opening, it would take roughly 1 hour for the 50% moisture line to reach the copper trace. For a second case assuming the copper trace offsets 20 um from the opening, it would take roughly 1.75 hours for the 50% moisture line to reach the copper trace. Accordingly, in this way, it is possible to determine target insertion loss degradation over time.

Figure 3A:
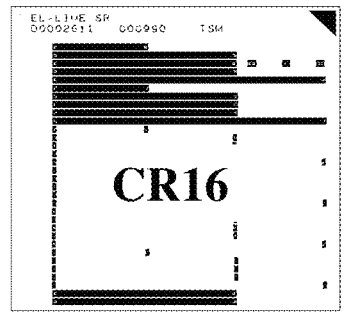
FIGS. 3A and 3B show a comparison of insertion loss between a conventional structure and the multi-layer substrate of the present invention, both dry and after moisture absorption.
Figure 3A:
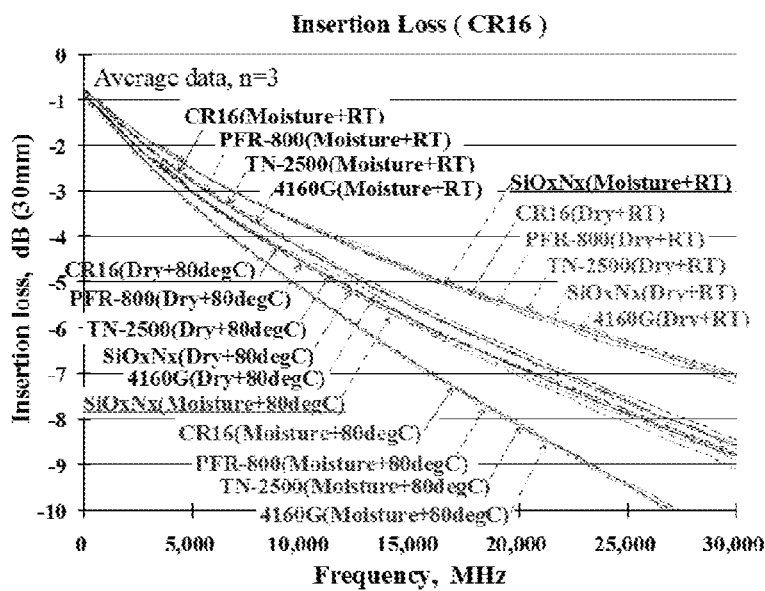
Figure 3B:
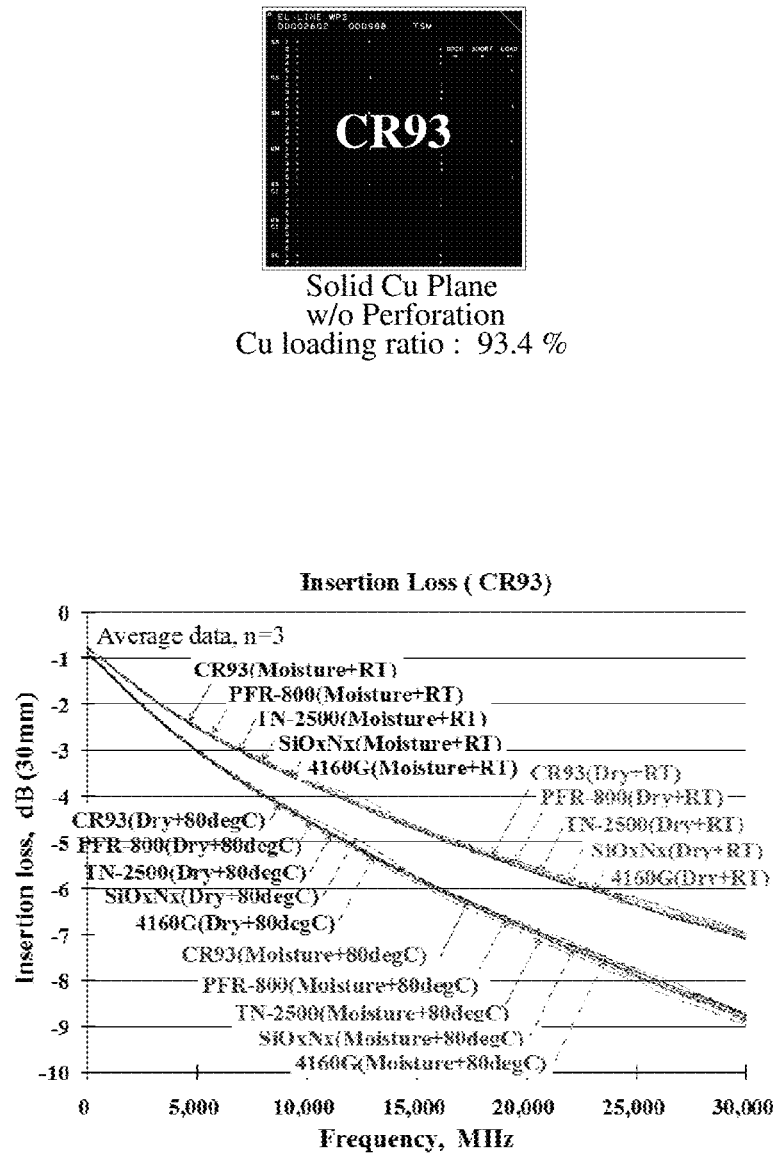

FIGS. 3A and 3B show a comparison graph of insertion loss between a conventional structure and the multi-layer substrate of the present invention. In this example, the graph of FIG. 3B shows a lower insertion loss over a frequency range for a given humidity level, time, and temperature of the present invention, compared to a conventional substrate design. More specifically, FIG. 3A shows a conventional structure; whereas, FIG. 3B shows less insertion loss for the multi-layer substrate of the present invention, compared to a conventional substrate at certain conditions.

Figure 4:
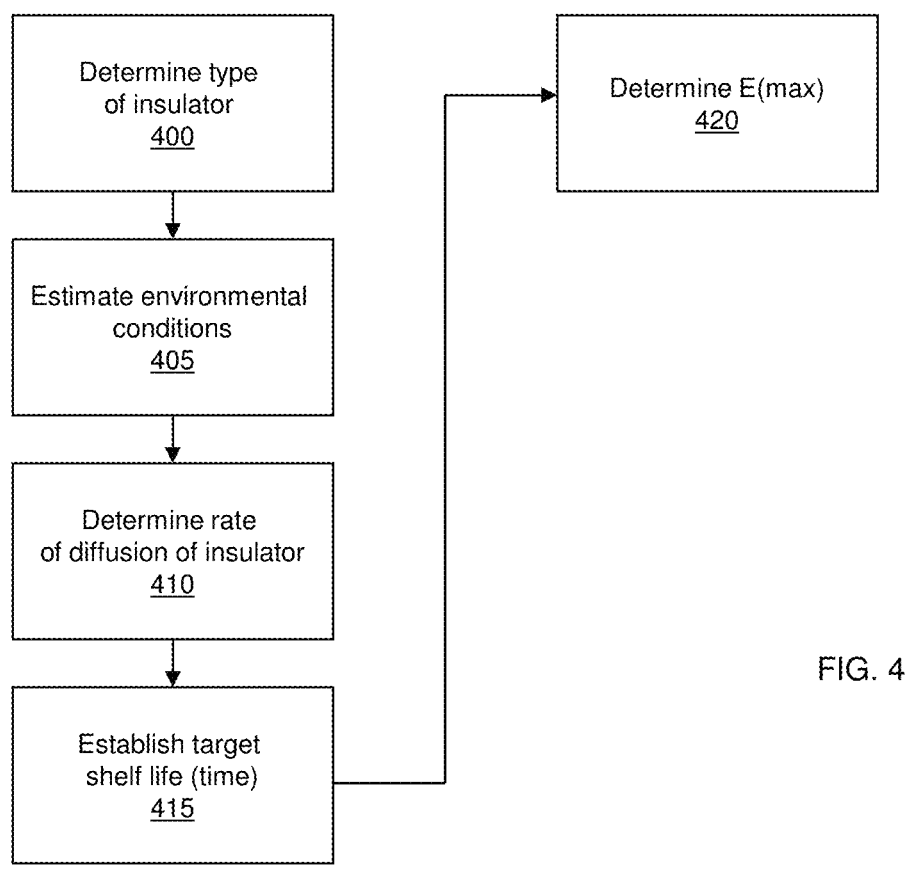
FIG. 4 shows a flowchart for designing the multi-layer substrate of the present invention.

FIG. 4 shows an exemplary flowchart for performing aspects of the present invention. FIG. 4 also illustrates the architecture, functionality, and operation of possible implementations of systems, methods, and computer program products according to various embodiments of the present invention. The computer program product may include a computer readable storage medium (or media) having computer readable program instructions thereon for causing a processor to carry out aspects of the present invention. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The steps of FIG. 4 may be implemented in a computing environment, e.g., computing device. In embodiments, the computing device includes a processor (e.g., CPU), memory, an I/O interface, and a bus. The bus provides a communications link between each of the components in computing device. The memory can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The computing device is in communication with external I/O device/resource and storage system. For example, I/O device can comprise any device that enables an individual to interact with computing device (e.g., user interface) or any device that enables computing device to communicate with one or more other computing devices using any type of communications link. In general, the processor executes computer program code (e.g., program control), which can be stored in memory and/or storage system. While executing the computer program code, the processor can read and/or write data to/from memory, storage system, and/or I/O interface.

In FIG. 4, at step 400, a type of insulating material is provided. At step 405, environmental conditions are estimated. For example, humidity levels and temperature can be estimated in order to maintain insertion loss criteria. At step 410, the diffusion coefficient for the insulator may be determined, as described herein. At step 415, an established, e.g., estimated shelf live (e.g., time to failure) for a particular device is provided. At step 420, E(max) is determined using the results of steps 400-415. That is, using the diffusion properties of the insulator material at a certain humidity, temperature and time period, it is possible to determine a setback from the edge of the opening in a metal plane to an underlying signal line.

Figure 5:
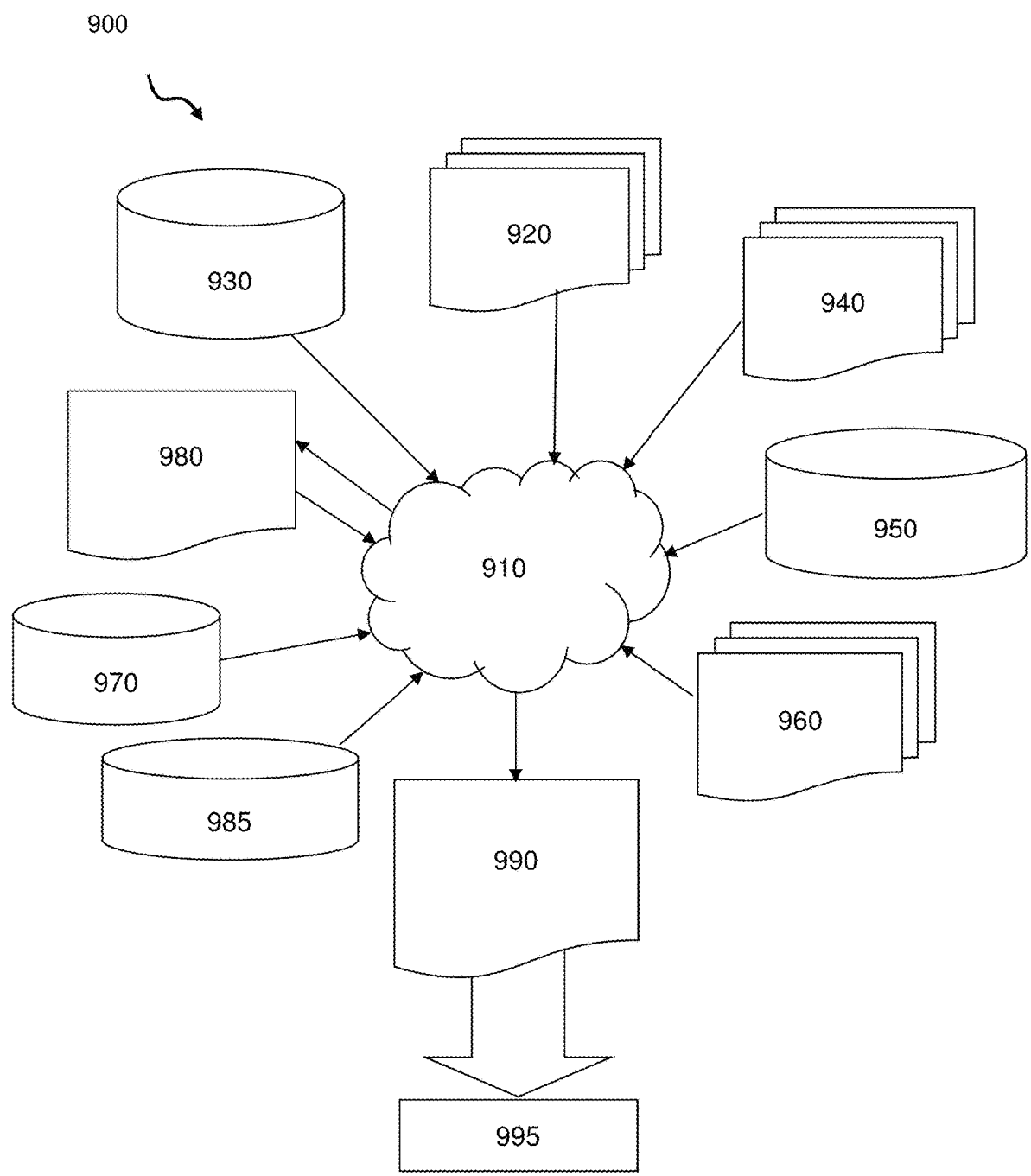
FIG. 5 is a flow diagram of a design process used in semiconductor design, manufacture, and/or test.

FIG. 5 is a flow diagram of a design process used in semiconductor design, manufacture, and/or test. FIG. 5 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1 and 2. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1 and 2. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1 and 2 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium) as discussed above) such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1 and 2. In one embodiment, design structure 990 may comprise a compiled, executable HDL simulation model that functionally simulates the devices shown in FIGS. 1 and 2.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1 and 2. Design structure 990 may then proceed to a stage 995 where, for example, design structure 990: proceeds to tape-out, is released to manufacturing, is released to a mask house, is sent to another design house, is sent back to the customer, etc.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A semiconductor structure, comprising:
a multi-layer substrate comprising a core layer, an outer metal layer formed over the core layer, a signal line in a metal layer formed between the core layer and the outer metal layer, and an insulator layer formed between the metal layer and the outer metal layer,
wherein the insulator layer separates and electrically insulates the signal line and the outer metal layer, wherein a distance through the insulator layer between an edge of an opening in the outer metal layer and a closest edge of the signal line is set at a calculated value to prevent moisture entering the opening in the outer metal layer from contacting the signal line over a predetermined period of time under predetermined temperature and humidity conditions to provide a predetermined target insertion loss degradation over time for the semiconductor structure,
wherein the outer metal layer is a moisture diffusion barrier for the insulator layer comprised of a metal plane, wherein the outer metal layer is comprised of a material which is denser and thicker than the metal layer, and wherein the opening in the outer metal layer is laterally offset from the signal line in the metal layer so that the distance through the insulator layer between the edge of the opening in the outer metal layer and the closest edge of the signal line is a distance based on an orthogonal distance between the outer metal layer and the metal layer and a lateral offset distance, perpendicular to the orthogonal distance, that the edge of the opening in the outer metal layer is spaced from the closest edge of the signal line in the metal layer,
wherein the target insertion loss degradation is based on a time required for a portion of the material closest to the closest edge of the signal line to reach a 50% saturation concentration following initial conditions of a top surface of the insulator layer being at a 100% saturation concentration and the portion of insulator layer immediately adjacent to the closest edge of the signal line being at a 0% saturation concentration,
wherein the insulator layer has a thickness of at least 15 µm,
wherein the lateral offset distance is at least 20 µm,
wherein a thickness of the outer metal layer is at least 8 µm, and
wherein the time required for the portion of the closest insulator material immediately adjacent to the edge of the signal line to reach the 50% saturation concentration is at least 1.75 hours.

2. The semiconductor structure of claim 1, wherein the semiconductor structure comprises an organic circuit.

3. The semiconductor structure of claim 1, wherein the core layer comprises a fiber glass epoxy substrate.

4. The semiconductor structure of claim 3, wherein metal layer and the outer metal layer are copper material.

5. The semiconductor structure of claim 3, wherein the insulator layer is comprised of polyimide based dielectric materials.

6. The semiconductor structure of claim 3, wherein the insulator layer is comprised of organic materials.

7. The semiconductor structure of claim 1, wherein the outer metal layer is clad with nickel.

8. The semiconductor structure of claim 1, wherein the insulator layer is a polyimide based dielectric material.

9. The semiconductor structure of claim 1, wherein the outer metal layer is a moisture diffusion barrier.

10. The semiconductor structure of claim 9, wherein the opening is a via in the outer metal layer.

11. The semiconductor structure of claim 1, wherein the diffusion coefficient is a number of milliliters of a gas that diffuses at a distance of 0.001 mm through a square centimeter surface per minute, at 1 atmosphere of pressure of the insulator layer.

* * * * *